United States Patent
Kang et al.

(10) Patent No.: US 9,867,165 B2
(45) Date of Patent: Jan. 9, 2018

(54) METHOD AND DEVICE FOR TRANSMITTING A FEEDBACK SIGNAL IN A MULTI-NODE SYSTEM

(75) Inventors: Jiwon Kang, Anyang-si (KR); Binchul Ihm, Anyang-si (KR); Sunam Kim, Anyang-si (KR); Jinyoung Chun, Anyang-si (KR); Sungho Park, Anyang-si (KR); Seunghee Han, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 243 days.

(21) Appl. No.: 13/811,253

(22) PCT Filed: Jul. 18, 2011

(86) PCT No.: PCT/KR2011/005264
§ 371 (c)(1),
(2), (4) Date: Jan. 18, 2013

(87) PCT Pub. No.: WO2012/011704
PCT Pub. Date: Jan. 26, 2012

(65) Prior Publication Data
US 2013/0115966 A1    May 9, 2013

Related U.S. Application Data

(60) Provisional application No. 61/365,353, filed on Jul. 19, 2010.

(51) Int. Cl.
*H04W 76/04* (2009.01)
*H04W 72/04* (2009.01)
*H04W 88/08* (2009.01)

(52) U.S. Cl.
CPC ...... *H04W 72/0406* (2013.01); *H04W 72/042* (2013.01); *H04W 72/0413* (2013.01); *H04W 88/085* (2013.01)

(58) Field of Classification Search
CPC ......... H04W 72/0406; H04W 72/0413; H04W 72/042; H04W 88/085
See application file for complete search history.

(56) References Cited

U.S. PATENT DOCUMENTS

| | | | |
|---|---|---|---|
| 6,449,290 B1 * | 9/2002 | Willars | H04B 7/2668 370/324 |
| 8,472,963 B2 * | 6/2013 | Caire | H04B 7/024 455/101 |

(Continued)

FOREIGN PATENT DOCUMENTS

| | | |
|---|---|---|
| JP | 2007502558 | 2/2007 |
| KR | 100635245 | 5/2004 |

OTHER PUBLICATIONS

PCT International Application No. PCT/KR2011/005264, Written Opinion of the International Searching Authority dated Feb. 6, 2012, 7 pages.

(Continued)

*Primary Examiner* — Mehmood B Khan
(74) *Attorney, Agent, or Firm* — Lee, Hong, Degerman, Kang & Waimey

(57) ABSTRACT

The present invention relates to wireless communication, and particularly, to a method and device for transmitting a feedback signal of a terminal in a multi-node system. The method for a terminal to transmit feedback information in a multi-node system including a plurality of nodes and a base station for controlling same includes: transmitting first information upon the request of resource allocation so as to give notice that there is information to be transmitted to the base station; receiving information from the base station at the request for the transmission of second information necessary for the resource allocation; and transmitting the requested second information to the base station. The feedback infor- (Continued)

mation may be transmitted to the base station together with the first information or the second information.

8 Claims, 12 Drawing Sheets

(56) References Cited

U.S. PATENT DOCUMENTS

| | | | | |
|---|---|---|---|---|
| 8,571,148 B1* | 10/2013 | Lee | H04L 27/2655 | 375/134 |
| 9,252,862 B2* | 2/2016 | Dayal | H04B 7/0667 | |
| 2001/0027114 A1* | 10/2001 | Kim | H04W 64/00 | 455/522 |
| 2001/0046864 A1* | 11/2001 | Bhatoolaul | H04W 52/04 | 455/442 |
| 2003/0171118 A1* | 9/2003 | Miya | H04B 7/022 | 455/442 |
| 2004/0017789 A1* | 1/2004 | Hoynck | H04W 74/0833 | 370/329 |
| 2004/0033816 A1* | 2/2004 | Semper | H04W 36/12 | 455/561 |
| 2004/0179495 A1* | 9/2004 | Ramakrishnan | H04B 7/0808 | 370/334 |
| 2004/0204105 A1* | 10/2004 | Liang | H04B 7/0608 | 455/562.1 |
| 2004/0224677 A1* | 11/2004 | Kuchibhotla | H04W 72/1284 | 455/422.1 |
| 2005/0117675 A1* | 6/2005 | Das | H04B 7/086 | 375/343 |
| 2005/0123004 A1* | 6/2005 | Lechleider | H04B 7/0413 | 370/529 |
| 2005/0197132 A1* | 9/2005 | Lee | H04L 5/0062 | 455/450 |
| 2005/0271025 A1* | 12/2005 | Guethaus | H04W 74/008 | 370/342 |
| 2006/0153282 A1* | 7/2006 | Jung | H04L 1/0618 | 375/146 |
| 2006/0203792 A1* | 9/2006 | Kogiantis | H04B 7/0691 | 370/343 |
| 2006/0250996 A1* | 11/2006 | Mella | H04W 72/10 | 370/278 |
| 2007/0116012 A1* | 5/2007 | Chang | H04W 48/18 | 370/395.52 |
| 2007/0133458 A1* | 6/2007 | Chandra | H04L 1/0025 | 370/329 |
| 2007/0281695 A1* | 12/2007 | Lohr | H04W 72/1278 | 455/436 |
| 2007/0287384 A1* | 12/2007 | Sadri | H04W 76/028 | 455/63.4 |
| 2008/0026773 A1* | 1/2008 | Hyun | H04W 64/00 | 455/456.1 |
| 2008/0227455 A1* | 9/2008 | Kim | H04W 36/0083 | 455/436 |
| 2009/0016303 A1* | 1/2009 | Shaik | H04B 7/0491 | 370/331 |
| 2009/0073062 A1* | 3/2009 | Tang | H04B 7/0608 | 343/703 |
| 2009/0135778 A1* | 5/2009 | Lee | H04W 72/1231 | 370/329 |
| 2009/0170514 A1* | 7/2009 | Yokoyama | H04W 74/08 | 455/436 |
| 2009/0180433 A1* | 7/2009 | Ahn | H04W 52/54 | 370/329 |
| 2009/0325579 A1* | 12/2009 | Kishiyama | H04W 74/0866 | 455/436 |
| 2010/0008455 A1* | 1/2010 | Willgert | H04B 7/10 | 375/346 |
| 2010/0056171 A1* | 3/2010 | Ramprashad | H04W 16/10 | 455/452.1 |
| 2010/0067599 A1* | 3/2010 | Dayal | H04L 27/261 | 375/267 |
| 2010/0091678 A1* | 4/2010 | Chen | H04B 7/024 | 370/252 |
| 2010/0091725 A1* | 4/2010 | Ishii | H04W 72/04 | 370/329 |
| 2010/0113057 A1* | 5/2010 | Englund | H04L 1/0026 | 455/452.1 |
| 2010/0118817 A1* | 5/2010 | Damnjanovic | H04L 1/0026 | 370/329 |
| 2010/0216483 A1* | 8/2010 | Tynderfeldt | H04B 7/0617 | 455/450 |
| 2010/0222055 A1* | 9/2010 | Cho | H04J 11/0086 | 455/434 |
| 2010/0284477 A1* | 11/2010 | Kwon | H04B 7/0417 | 375/260 |
| 2010/0317382 A1* | 12/2010 | Lee, II | H04B 7/0628 | 455/501 |
| 2010/0323745 A1* | 12/2010 | Chen | H04W 52/325 | 455/522 |
| 2011/0019694 A1* | 1/2011 | Kwon | H04L 27/2613 | 370/474 |
| 2011/0039552 A1* | 2/2011 | Narasimha | H04W 76/028 | 455/425 |
| 2011/0075628 A1* | 3/2011 | Cho | H04W 72/0413 | 370/329 |
| 2011/0158104 A1* | 6/2011 | Frenger | H04W 74/0833 | 370/241 |
| 2011/0158188 A1* | 6/2011 | Womack | H04W 56/0005 | 370/329 |
| 2011/0188447 A1* | 8/2011 | Wang | H04L 5/0053 | 370/328 |
| 2011/0243075 A1* | 10/2011 | Luo | H04W 74/004 | 370/329 |
| 2011/0243106 A1* | 10/2011 | Hsu | H04L 5/0096 | 370/336 |
| 2011/0275376 A1* | 11/2011 | Boldi | H04B 7/022 | 455/436 |
| 2011/0287798 A1* | 11/2011 | Ono | H04B 7/024 | 455/509 |
| 2012/0046065 A1* | 2/2012 | Amirijoo | H04W 16/10 | 455/524 |
| 2012/0113831 A1* | 5/2012 | Pelletier | H04L 5/0058 | 370/252 |
| 2012/0134673 A1* | 5/2012 | Palanisamy | H04B 10/25754 | 398/58 |
| 2012/0149362 A1* | 6/2012 | Tooher | H04W 24/10 | 455/423 |
| 2012/0276915 A1* | 11/2012 | Kubota | H04B 7/024 | 455/452.1 |
| 2012/0287875 A1* | 11/2012 | Kim | H04B 7/024 | 370/329 |
| 2013/0044722 A1* | 2/2013 | Kang | H04L 1/1861 | 370/329 |
| 2013/0077523 A1* | 3/2013 | Ko | H04W 24/00 | 370/252 |
| 2013/0223235 A1* | 8/2013 | Hu | H04W 36/04 | 370/242 |
| 2015/0223178 A1* | 8/2015 | Pietraski | H04L 5/001 | 370/252 |
| 2016/0323915 A1* | 11/2016 | Liu | H04W 16/14 | |

OTHER PUBLICATIONS

Huawei, "Simultaneous transmission of CQI, ACK/NACK or SRI on PUCCH in carrier aggregation" R1-103887, Jul. 2010, 8 pages.

* cited by examiner

FIG. 11

| Syntax | Size (bit) | Notes |
|---|---|---|
| BR without STID header () { | | |
| FID | 4 | Flow identifier. Set to 0001. |
| Type | 5 | MAC signaling header type = 0b00001 |
| Length | 3 | Indicates the lenght of the signaling header in bytes. |
| BR Type | 1 | Indicates whether the requested bandwidth is incremental or aggregate:<br>0: aggregate<br>1: incremental |
| BR Size | 19 | Bandwidth request size in bytes. |
| BR FID | 4 | The FID for which UL bandwidth is requested. |
| Reserved | 4 | shall be filled by 0 |

METHOD AND DEVICE FOR TRANSMITTING A FEEDBACK SIGNAL IN A MULTI-NODE SYSTEM

CROSS-REFERENCE TO RELATED APPLICATIONS

This application is the National Stage filing under 35 U.S.C. 371 of International Application No. PCT/KR2011/005264, filed on Jul. 18, 2011, which claims the benefit of U.S. Provisional Application Ser. No. 61/365,353, filed on Jul. 19, 2010, the contents of which are all hereby incorporated by reference herein in their entirety.

TECHNICAL FIELD

The present invention relates to wireless communication, and more particularly, to a method and device for, at a terminal, transmitting a feedback signal in a multi-node system.

BACKGROUND ART

Recently, since various devices requiring machine-to-machine (M2M) communication and high data transfer rate, such as smartphones or tablet personal computers (PCs), have appeared and come into widespread use, a data transfer rate of a wireless communication network has been rapidly increased. In order to satisfy the required high data transfer rate, recently, carrier aggregation (CA) technology which efficiently uses more frequency bands, cognitive ratio technology, multiple antenna technology for increasing data capacity in a restricted frequency, multiple base station cooperative transmission technology, etc. have been spotlighted.

In addition, a wireless communication network has evolved such that the density of accessible nodes is increased in the vicinity of a user. Here, the node refers to antennas or antenna groups spaced apart from each other by a predetermined distance or more in a distributed antenna system (DAS). However, the meaning of the node is not limited thereto and the node may have a wider meaning. That is, the node may include a picocell base station (PeNB), a home base station (HeNB), a remote radio head (RRH), a remote radio unit (RRU), a relay, distributed antennas (group), etc. A wireless communication system including nodes with high density may have higher system performance by cooperation between nodes. That is, unlike the case in which each node is an independent base station (BS), an advanced BS (ABS), a Node-B (NB), an eNode-B (eNB) or an access point (AP) which operates without cooperation, if one control station manages transmission and reception of each node such that each node operates as an antenna or antenna group for one cell, better system performance can be achieved. Hereinafter, a wireless communication system including a plurality of nodes is referred to as a multi-node system.

In a multi-node system, if each node performs scheduling and handover using an identifier (ID) thereof, the multi-node system may be regarded as a multi-cell system. In a multi-cell system, if the coverage areas of cells (that is, nodes) overlap, the multi-cell system is referred to as a multi-tier network.

DISCLOSURE

Technical Problem

An object of the present invention is to provide a method and device for transmitting a feedback signal from a terminal to a base station in a multi-node system.

The technical problems solved by the present invention are not limited to the above technical problems and other technical problems which are not described herein will become apparent to those skilled in the art from the following description.

Technical Solution

The object of the present invention can be achieved by providing a method of transmitting feedback information at a terminal in a multi-node system including a plurality of nodes and a base station for controlling the plurality of nodes, the method including transmitting first information for requesting resource assignment to the base station, receiving information for requesting transmission of second information necessary for resource assignment from the base station, and transmitting the requested second information to the base station, wherein the feedback information is related to at least one of the plurality of nodes and is transmitted to the base station along with the first information or the second information.

Each of the plurality of nodes may be connected to the base station by wire.

The node may include a macro base station, a picocell base station (PeNB), a home base station (HeNB), a remote radio head (RRH), a relay, an antenna and a distributed antenna group.

The first information may be scheduling request (SR) information or bandwidth request (BR) information.

The second information may include bandwidth information necessary for the resource assignment.

The feedback information may include a reception signal level of a downlink signal of at least one of the plurality of nodes.

If the number of nodes to be fed back by the terminal is predetermined, the feedback information may be related to the predetermined number of nodes.

The feedback information may be related to a node having a predetermined reception signal level or more.

The feedback information may further include at least one of the number of the node having the predetermined reception signal level or more and identification information of the node.

In another aspect of the present invention, there is provided a terminal for transmitting feedback information in a multi-node system including a plurality of nodes and a base station for controlling the plurality of nodes, the terminal including a transmission module for transmitting first information for requesting resource assignment to the base station, a reception module for receiving information for requesting transmission of second information necessary for resource assignment from the base station, and a processor for controlling transmission of the requested second information to the base station through the transmission module, wherein the feedback information is related to at least one of the plurality of nodes and is transmitted to the base station along with the first information or the second information.

Each of the plurality of nodes may be connected to the base station by wire.

The node may include a macro base station, a picocell base station (PeNB), a home base station (HeNB), a remote radio head (RRH), a relay, an antenna and a distributed antenna group.

The first information may be scheduling request (SR) information or bandwidth request (BR) information.

The second information may include bandwidth information necessary for the resource assignment.

The feedback information may include a reception signal level of a downlink signal of at least one of the plurality of nodes.

The feedback information may be related to a node having a predetermined reception signal level or more.

The feedback information may further include at least one of the number of the node having the predetermined reception signal level or more and identification information of the node.

Advantageous Effects

In a multi-node system, a terminal can efficiently transmit feedback information to a base station according to the present invention.

The effects of the present invention are not limited to the above-described effects and other effects which are not described herein will become apparent to those skilled in the art from the following description.

DESCRIPTION OF DRAWINGS

FIG. 11 is a diagram showing an example of a format of a bandwidth request header in IEEE 802.16m.

BEST MODE

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. IEEE 802.16m is an evolved version of IEEE 802.16e.

Figure 1:
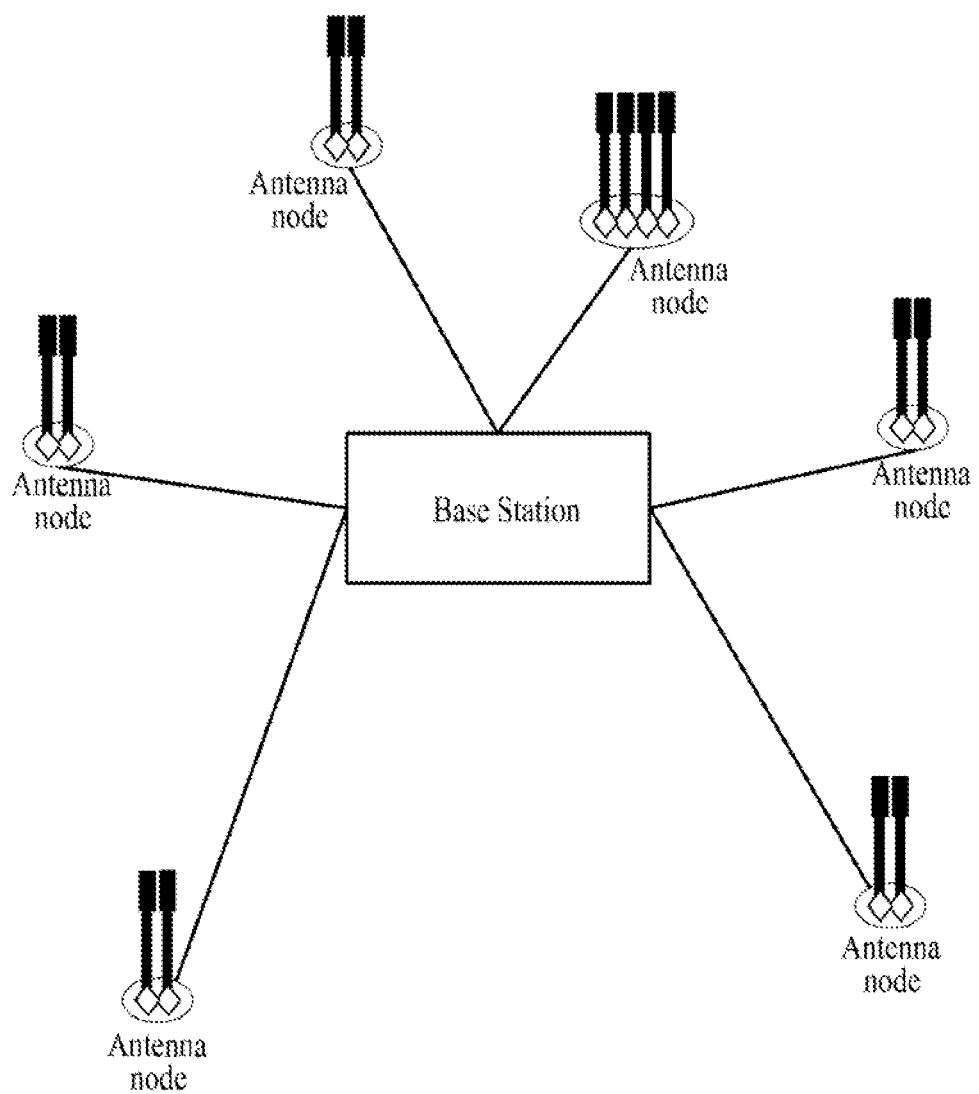
FIG. 1 is a diagram showing an example of a multi-node system.

FIG. 1 is a diagram showing an example of a multi-node system.

Referring to FIG. 1, the multi-node system includes a base station and a plurality of nodes.

In FIG. 1, a node represented by an antenna node may mean a macro base station a picocell base station (PeNB), a home base station (HeNB), a remote radio head (RRH), a relay, a distributed antenna (group), etc. Such a node is referred to as a point.

In the multi-node system, if one base station controller manages transmission and reception of all nodes such that an individual node operates as a part of one cell, the multi-node system may be regarded as a distributed antenna system (DAS) forming one cell. In the DAS, individual nodes may be assigned respective node IDs or operate as an antenna group of the cell without separate node IDs. In other words, the DAS refers to a system in which antennas (that is, nodes) are distributed at various positions in a geographical region and are managed by a base station. The DAS is different from a centralized antenna system (CAS) in which antennas of a base station are positioned at the center of a cell.

If an individual node has an individual cell ID and performs scheduling and handover in the multi-node system, the multi-node system may be regarded as a multi-cell (e.g., macrocell/femtocell/picocell) system. If the coverage areas of such multiple cells overlap, the multi-node system is referred to as a multi-tier network.

Figure 2:
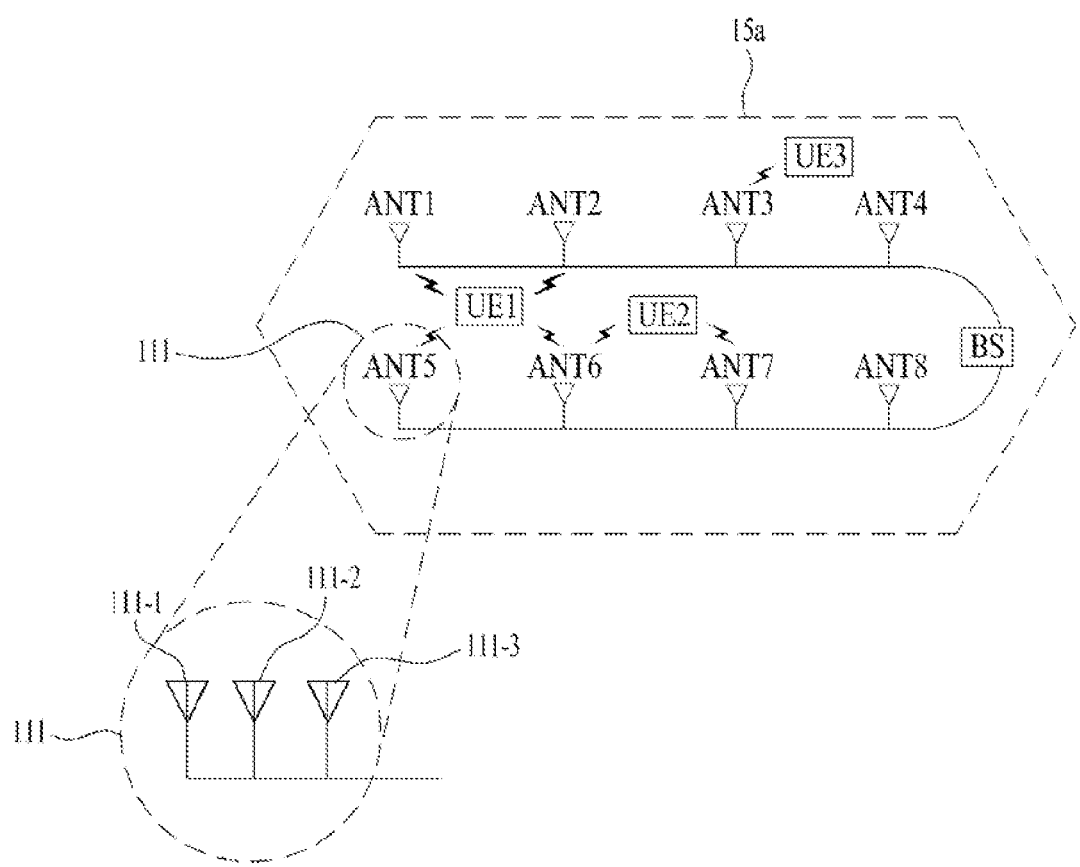
FIG. 2 is a diagram showing a distributed antenna system which is an example of a multi-node system.

FIG. 2 is a diagram showing a distributed antenna system (DAS) which is an example of a multi-node system.

Referring to FIG. 2, the DAS includes a base station (BS) and a plurality of BS antennas (e.g., ant1 to ant8; hereinafter, the BS antenna is referred to as an antenna). The antennas ant1 to ant 8 may be connected to the BS by wire. In the DAS, antennas are not centralized at a specific point of a cell 15*a*, for example, at the center of the cell, but are distributed at various positions in the cell, unlike the conventional CAS. As shown in FIG. 2, one antenna may be separately present at each place in the cell (antennas 1 to 4 and 6 to 8) and several antennas 111-1, 111-2 and 111-3 may be concentrated at one place (an antenna 5 (111)). The concentrated antennas may configure one antenna node.

Coverage areas of the antennas are overlapped to enable transmission of rank 2 or more. For example, the coverage area of each antenna may influence an adjacent antenna. In this case, the strengths of signals received by terminals present in the cell from a plurality of antennas may be variously changed according to the positions of the terminals within the cell or the channel states. Referring to the example of FIG. 2, a terminal 1 (UE 1) may receive signals having good reception sensitivity from antennas 1, 2, 5 and 6. In contrast, signals transmitted from antennas 3, 4, 7 and 8 may barely influence the terminal 1 due to path loss.

A terminal 2 (UE 2) may receive signals having good reception sensitivity from antennas 6 and 7 and signals transmitted from the remaining antennas may barely influence the terminal 2. Similarly, a terminal 3 (UE 3) may receive signals having good reception sensitivity from an antenna 3 and the strengths of the signals from the remaining antennas may be negligible.

In the DAS, multiple input multiple output (MIMO) communication may be easily performed with respect to terminals separated from each other within the cell. In the above example, communication may be performed through antennas 1, 2, 5 and 6 with respect to a terminal 1, communication may be performed through an antenna 7 with respect to a terminal 2, and communication may be performed through an antenna 3 with respect to a terminal 3. Antennas 4 and 8 may transmit signals for terminal 2 or 3 or may not transmit a signal. That is, the antennas 4 and 8 may be turned off according to circumstances.

As described above, if MIMO communication is performed in the DAS, the number of layers (that is, the number of transmission streams) per terminal may vary. In addition, antennas (antenna groups) assigned to terminals may be different. In other words, in the DAS, a specific antenna (or a specific antenna group) in a system may be supported with respect to each terminal. The antenna supported with respect to the terminal may be changed with time.

Hereinafter, a process of exchanging information in order to transmit and receive data between a base station and a terminal in a multi-node system will be described.

In the multi-node system, a step of exchanging information between the terminal and the base station may be roughly divided into four steps: a cell entry step, a step of preparing for node assignment of the base station, a node assignment step and a data transmission and reception step. Hereinafter, this will be described in detail with reference to FIG. 3.

Figure 3:
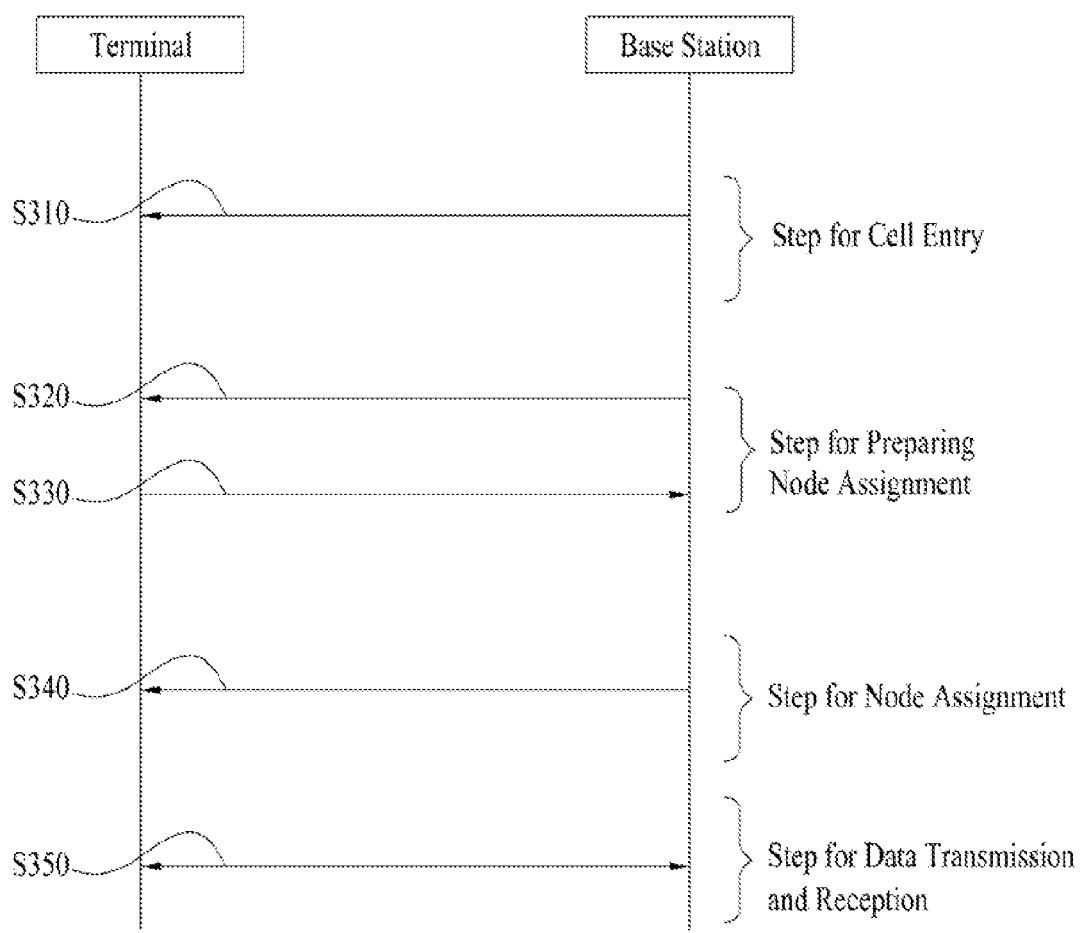
FIG. 3 is a diagram showing an example of an information exchange step required to transmit and receive data between a base station and a terminal in a multi-node system.

FIG. 3 is a diagram showing an example of an information exchange step required to transmit and receive data between a base station and a terminal in a multi-node system.

First, a cell entry step S310 is performed between the base station and the terminal.

If the terminal enters the multi-node system (e.g., initial network entry, network reentry, scanning, handover, etc.), the base station informs the terminal of configuration information of the multi-node system. This is referred to as the cell entry step.

That is, the terminal performs the cell entry step S310 such as synchronization with the base station when the terminal is powered on or enters a new cell.

The terminal may receive a synchronization channel (SCH) from the base station, perform synchronization with the base station, and acquire information such as a cell ID. Thereafter, the terminal may acquire intra-cell broadcast information from the base station.

In addition, the UE may receive a Downlink Reference Signal (DL RS) so as to confirm a downlink channel state in the initial cell entry step S310.

At this time, the configuration information of the multi-node system acquired from the base station by the terminal may include at least one of the total number of nodes within the multi-node system, the total number of antennas, the number of antennas of each node, etc.

The terminal which has performed the cell entry step may perform the step of preparing for node assignment from the base station.

In this step, the base station acquires information necessary to assign a node to the terminal from the terminal. For example, the base station may acquire the strength of an uplink signal, an uplink sounding signal, feedback information, etc. from the terminal.

The step of preparing for node assignment includes step S320 of, at the base station, requesting the terminal to transmit necessary information in order to acquire the necessary information and step S330 of the terminal transmitting the requested information to the base station.

In step S320, the base station may transmit, to the terminal, information such as an uplink sounding signal request, a feedback request, a request for the type of information to be fed back by the terminal, a request for the number of antenna nodes to be included in feedback information of the terminal.

At this time, the uplink sounding signal request is necessary to perform node assignment based on the uplink sounding signal.

In addition, if node assignment is performed based on a difference between uplink and downlink channels and feedback information of the terminal, the base station may request feedback and information about feedback from the terminal.

The information transmitted by the base station may be broadcast to terminals or transmitted to a terminal or a terminal group in unicast if the base station receives different types of feedback information per terminal.

Step S320 and step S310 may be simultaneously performed. That is, when a parameter of the multi-node system is transmitted to the terminal in step S310, the uplink signal transmission request signal may also be broadcast.

In addition, the feedback request may be omitted if the standard defines that feedback for node assignment is performed after the terminal acquires the parameter of the multi-node system.

In addition to the above information, the existing signaling information for a general communication operation may be transmitted to the terminal. For example, transmit power control information of each terminal may be transmitted when the uplink sounding signal is transmitted in addition to the uplink sounding request.

Next, step S330 of, at the terminal, transmitting the requested information to the base station will be described.

Uplink signal transmission is performed when the base station requests uplink signal transmission or at a predetermined time.

The uplink signal is necessary to, at the base station, assign nodes to the terminals and may include an uplink sounding signal, a reference signal, various feedback signals, etc.

At this time, the terminal may measure the strength of a downlink signal of each node using the signal received from each node and transmit a feedback signal to the base station.

The various feedback signals may include at least one of reception strength of each node in uplink, reception strength of a downlink transmission node selected by the terminal among all nodes in downlink, the number of downlink transmission antenna nodes requested by the terminal, the number of downlink transmission nodes satisfying a predetermined condition, an identifier (e.g., an index) of a transmission antenna node preferred by the terminal among all downlink transmission antenna nodes and an identifier of a transmission antenna node satisfying a predetermined condition among all downlink transmission antenna nodes. At this time, the identifier of the node may be transmitted in the form of a bitmap.

The predetermined condition may indicate that the downlink signal reception strength of the node exceeds a threshold, for example.

If the base station specifies the number of antenna nodes to be fed back to the terminal, the terminal may feed indices and reception strength of antenna nodes having maximum reception strength and indices and reception strength of antenna nodes having minimum reception strength back to the base station according to the number of nodes.

Thereafter, the base station performs node assignment step S340.

In node assignment step S340, the base station acquires the feedback information, the uplink sounding signal, etc. through the uplink signal and transmits the assigned node information to each terminal. That is, the base station informs the terminal of base station antenna node information to be used in uplink or downlink per terminal or terminal group.

The antenna node assignment information may include information about base station antennas or antenna nodes which will be used by the terminal in downlink or uplink, the number of antennas included in each antenna node to be used and a pilot pattern of each antenna.

At this time, different nodes may be used by the terminal in downlink and uplink.

If antenna node assignment has been completed, the terminals may receive data from the specified antenna nodes and transmit data to the base station through the specified antenna nodes (S350). Step S350 of transmitting and receiving the data may be performed using a general method through the specified antenna node.

From the viewpoint of the terminal, cell entry step S310 may be performed only upon initial cell entry and the remaining steps S320, S330, S340 and S350 may be repeatedly performed.

That is, initially, steps from cell entry step S310 to data transmission and reception step S350 may be sequentially performed. However, after or during data transmission and reception step S350, steps S320 and S330 for preparing node assignment may be performed.

For example, feedback information such as CQI or PMI transmitted upon data exchange and a variety of feedback information for antenna assignment in steps S320 and S330 of preparing for node assignment may be simultaneously transmitted. Alternatively, the base station may transmit the feedback or uplink sounding signal request to the terminal to collect information about node assignment upon downlink control information transmission in the data exchange process.

Node assignment step S340 is not necessarily performed after steps S320 and S330 of preparing for node assignment. That is, even when the base station acquires information through the feedback and uplink sounding signal, etc., node assignment step S340 may be more intermittently performed according to the speed and position change of the terminal.

When the base station changes antenna node assignment information (node assignment step S340), since the terminal recognizes the changed antenna node information and then exchanges data, node assignment step S340 is performed independently of data transmission and reception step S350.

If steps S320 and S330 of preparing for node assignment is performed simultaneously with data transmission and reception step S350, the steps may be performed in the following order. Here, parentheses mean that, while a step is performed, another step may be performed.

First step→second step→third step→fourth step (second step)→third step→fourth step (second step)→third step→fourth step (second step)→third step→fourth step (second step)→ . . . .

Next, the structure of the radio frame to which the present invention is applicable will be described.

Although the structure of the radio frame applied in 3GPP LTE is described for convenience of description, the present invention is not limited thereto and various structures of the radio frame are possible.

Figure 4:
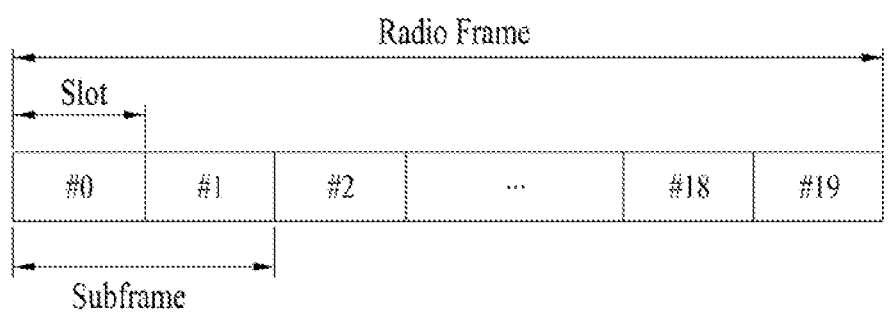
FIG. 4 is a diagram showing the structure of a frequency division duplex (FDD) radio frame in $3^{rd}$ generation partnership project (3GPP) long term evolution (LTE)

FIG. 4 is a diagram showing the structure of a frequency division duplex (FDD) radio frame in $3^{rd}$ generation partnership project (3GPP) long term evolution (LTE). Such a radio frame is referred to as frame structure type 1.

Referring to FIG. 4, the radio frame includes ten subframes and one subframe includes two continuous slots. A time required for transmitting one subframe is defined as a transmission time interval (TTI). The duration of the radio frame is $T_f=307200*T_s=10$ ms and includes 20 slots. The duration of each slot is $T_{slot}=15360*T_s=0.5$ ms and the 20 slots are numbered 0 to 19. Downlink, in which each node or base station transmits a signal to the terminal, and uplink, in which the terminal transmits a signal to each node or base station, are distinguished in a frequency domain.

Figure 5:
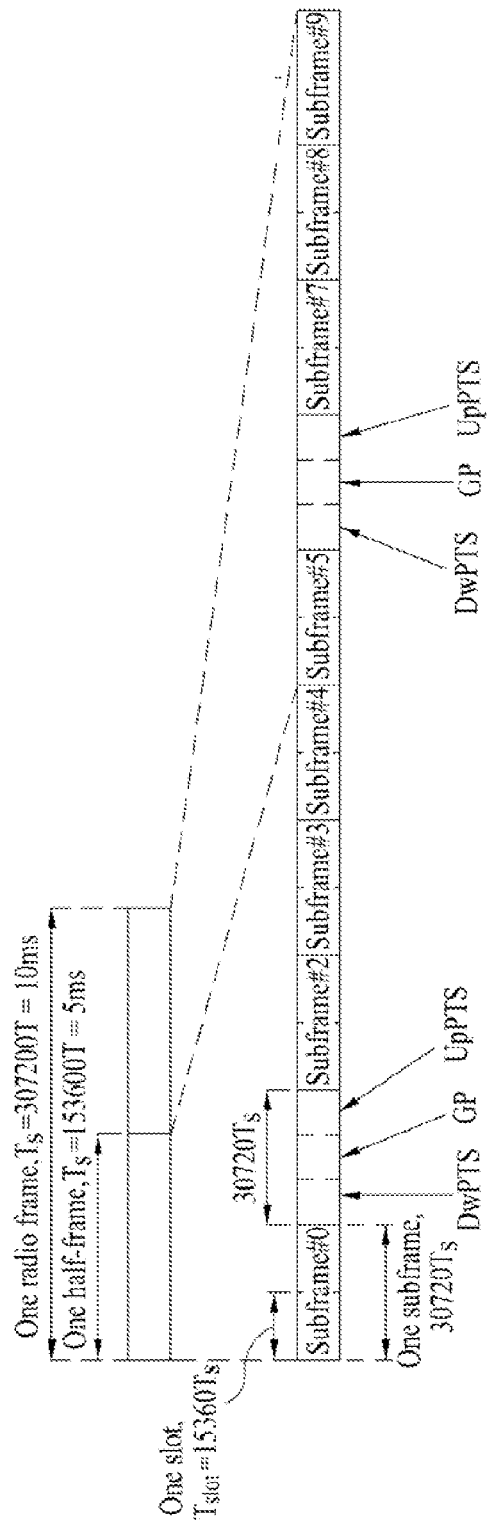
FIG. 5 is a diagram showing the structure of a time division duplex (TDD) radio frame in 3GPP LTE.

FIG. 5 is a diagram showing the structure of a time division duplex (TDD) radio frame in 3GPP LTE. Such a radio frame structure is referred to as frame structure type 2.

Referring to FIG. 5, one radio frame has a length of 10 ms and includes two half-frames each having a length of 5 ms. In addition, one half-frame includes five subframes each having a length of 1 ms. One subframe is set to any one of an uplink (UL) subframe, a downlink (DL) subframe and a special subframe. One radio frame includes at least one uplink subframe and at least downlink subframe. One subframe is defined as two continuous slots. For example, the length of one subframe may be 1 ms and the length of one slot may be 0.5 ms.

The special subframe is a specific period for dividing uplink and downlink between an uplink subframe and a downlink subframe. One radio frame includes at least one special subframe and the special subframe includes a downlink pilot time slot (DwPTS), a guard period, and an uplink pilot time slot (UpPTS). DwPTS is used to perform initial cell search, synchronization or channel estimation. The UpPTS is used to perform channel estimation in a base station and uplink transmission synchronization of a terminal. The guard period is used to eliminate interference occurring in uplink due to multi-path delay of a downlink signal between uplink and downlink.

In the FDD and TDD radio frames, one slot includes a plurality of orthogonal frequency division multiplexing (OFDM) symbols in a time domain and includes a plurality of resource blocks (RBs) in a frequency domain. An OFDM symbol represents one symbol period because 3GPP LTE uses OFDMA in downlink and may be called SC-FDMA symbol. The resource block is a resource assignment unit and includes a plurality of continuous subcarriers per slot.

For the structure of the radio frame described with reference to FIGS. 4 and 5, refer to Chapters 4.1 and 4.2 of 3GPP TS 36.211 V8.3.0 (2008-05) "Technical Specification Group Radio Access network; Evolved Universal Terrestrial Radio Access (E-UTRA); Physical Channels and Modulation (Release 8)".

The above-described structure of the radio frame is only exemplary and the number of subframes included in the radio frame, the number of slots included in the subframe and the number of OFDM symbols included in the slot may be changed in various ways.

Figure 6:
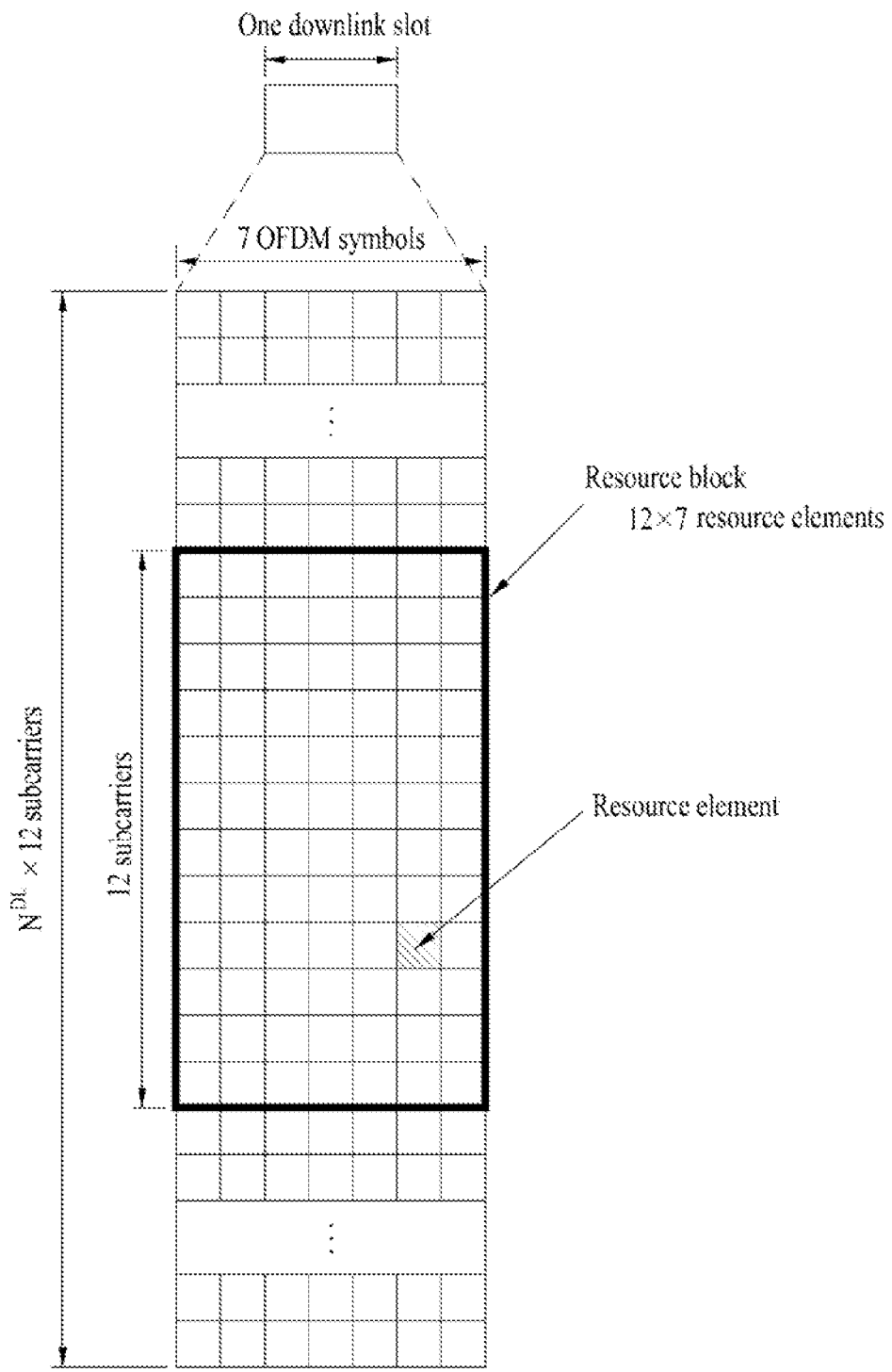
FIG. 6 is a diagram showing an example of resource grid of one downlink slot.

FIG. 6 is a diagram showing an example of resource grid of one downlink slot.

Referring to FIG. 6, one downlink slot includes a plurality of OFDM symbols in a time domain. Although one downlink slot includes 7 OFDMA symbols and one RB includes 12 subcarriers in the frequency domain in the above-described example, the present invention is not limited thereto.

Each element on the resource grid is referred to as a resource element and one RB includes 12×7 resource elements. The number $N^{DL}$ of RBs included in a downlink slot depends on downlink transmission bandwidth. The resource grid of the downlink slot is applicable to an uplink slot.

Figure 7:
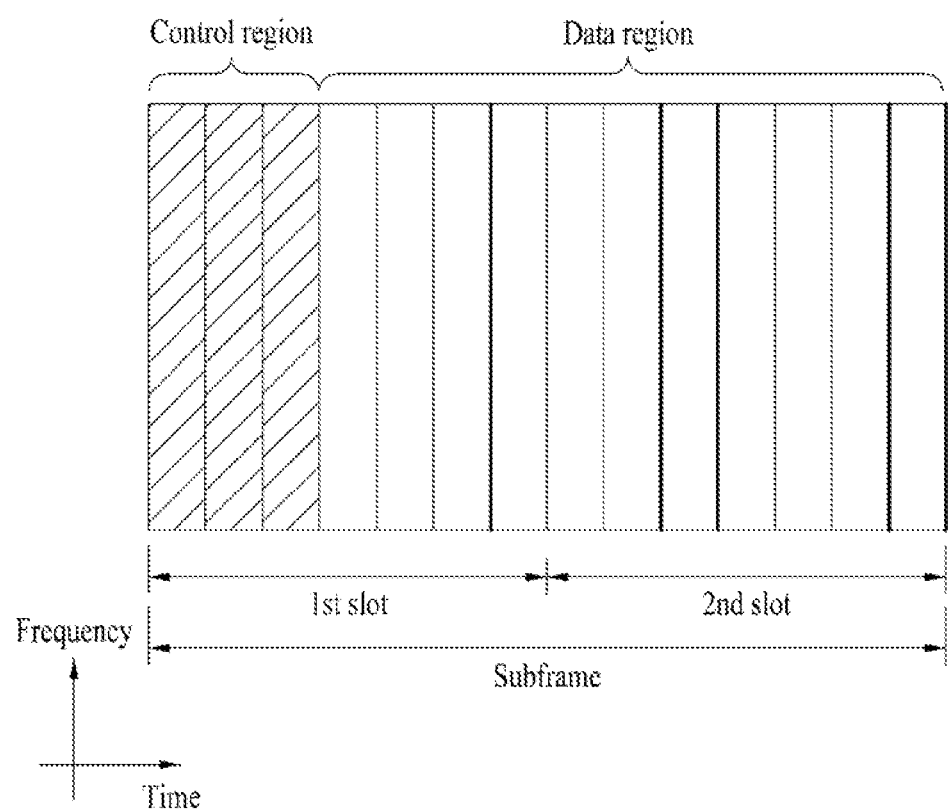
FIG. 7 is a diagram showing an example of a downlink subframe structure.

FIG. 7 is a diagram showing an example of a downlink subframe structure.

Referring to FIG. 7, a subframe includes two continuous slots. At most first three OFDM symbols of a first slot in a subframe correspond to a control region to which downlink control channels are assigned and the remaining OFDM symbols correspond to a data region to which physical downlink shared channels (PDSCHs) are assigned.

A downlink control channel includes a physical control format indicator channel (PCFICH), a physical downlink control channel (PDCCH), a physical hybrid-ARQ indicator channel (PHICH), etc. A PCFICH transmitted at a first OFDM symbol of a subframe carries information about the number of OFDM symbols (that is, the size of the control region) used to transmit control channels within a subframe. Control information transmitted through a PDCCH is referred to as downlink control information (DCI). The DCI indicates uplink resource assignment information, downlink resource assignment information and uplink transmit power control command of arbitrary UE groups. The PHICH carries an acknowledgement (ACK)/negative-acknowledgement (NACK) signal of a hybrid automatic repeat request (HARQ) of uplink data. That is, the ACK/NACK signal of the uplink data transmitted by the terminal is transmitted via the PHICH.

The PDSCH is a channel for transmitting control information and/or data. The terminal may decode downlink control information transmitted via a PDCCH and read data transmitted through a PDSCH.

Hereinafter, steps S320 and S330 of preparing for node assignment in the information exchange step required to transmit and receive data between the base station and the terminal in the above-described multi-node system will be described in greater detail. In particular, a method of transmitting a variety of feedback information different from general feedback information (e.g., CQI, PMI, RI, ACK/NACK information, etc.) from the terminal to the base station will be described in detail.

When the terminal acquires information about the configuration of the multi-node system in cell entry step S310, the terminal may transmit a variety of feedback information to the base station in steps S320 and S330 of preparing for node assignment.

The variety of feedback information may include at least one of reception strength of each node in uplink, reception strength of a downlink transmission node selected by the terminal among all nodes, the number of downlink transmission antenna nodes requested by the terminal, the number of downlink transmission nodes satisfying a predetermined condition, an identifier (e.g., an index) of a transmission antenna node preferred by the terminal among all downlink transmission antenna nodes and an identifier of a transmission antenna node satisfying a predetermined condition among all downlink transmission antenna nodes.

The predetermined condition may indicate that the downlink signal reception strength of the node exceeds a threshold, for example. If the base station specifies the number of antenna nodes to be fed back to the terminal, the terminal may transmit indices and reception strength of antenna nodes having maximum reception strength and indices and reception strength of antenna nodes having minimum reception strength to the base station as feedback information according to the number of nodes.

In order to distinguish between general feedback information (e.g., CQI, PMI, RI, ACK/NACK information, etc.) and the above-described variety of feedback information, the variety of feedback information is referred to as preferred antenna node information. The preferred antenna node information is only exemplary and may further include various other feedback signals.

Hereinafter, a time when the preferred antenna node information is transmitted to the base station will be described in greater detail.

1. After Network Connection and Scheduling have been Completed

This is a most common feedback method of preferred antenna node information. Preferred antenna node information is transmitted via a channel (e.g., a PUCCH or a PUSCH in LTE or an uplink feedback channel of IEEE 802.16m), via which the general feedback information (e.g., CQI, PMI, RI, ACK/NACK information, etc.) is transmitted, after network connection and scheduling have been completed.

2. Network Entry

As a second method, there is a method of feeding preferred antenna node information may be fed back upon network entry. At this time, network entry may include initial entry, reentry, handover, etc.

That is, upon network entry, the terminal reports preferred antenna node information to the base station in a negotiation process between the terminal and the base station. In this case, the base station may advantageously determine resource assignment to the terminal and cell entry allowance in consideration of traffic load of each antenna node.

At this time, the preferred antenna node information may be fed back not only via a channel, via which the general feedback information is transmitted, but also via a channel (e.g., a PUCCH or a PUSCH in LTE or an uplink feedback channel of IEEE 802.16m) used upon initial access.

In a random access channel (RACH) of LTE-A, when a preamble sequence is randomly selected from among 64 random access preambles, the range of a selectable RA sequence may be predefined per antenna node.

At this time, eight antenna nodes #0 to #7 are present, a terminal which prefers an antenna node #n may select and use one of RA preambles having indices of 8n to 8n+7 among preamble indices 0 to 63.

The same method is applicable upon ranging preamble code selection in IEEE 802.16m. At this time, the terminal may perform synchronization using a synchronization signal (SFH) before network entry and previously decide a preferred antenna node using a signal transmitted from the base station per antenna node.

In addition, preferred antenna node information may be added to a ranging request message (e.g., AAI_RNG-REQ in IEEE 802.16m) field or a new message field used for network entry including initial entry, reentry, handover, etc. may be generated such that the terminal reports preferred antenna node information to the base station. At this time, the base station may request the terminal to feed the preferred antenna node information back through the existing message field or the new message field.

3. Upon Bandwidth Request (BR) or Scheduling Request (SR) After Network Connection If network entry has been completed, in order to enable the network-connected terminal to perform uplink transmission, a request for UL resource assignment is preferentially transmitted to the base station.

The request for UL resource assignment is referred to as a bandwidth request (BR) or a scheduling request (SR).

Hereinafter, the BR and the SR may be used interchangeably and may be treated as the same request for UL resource assignment.

The terminal may transmit the BR or the SR to the base station and, at the same time, transmit the preferred antenna node information. If this method is used, since the terminal may transmit the preferred antenna node information to the base station before the base station assigns an antenna node to the terminal, time and procedure may be remarkably simplified.

That is, if a conventional method is used, after the terminal transmits the BR or the SR and then the base station triggers transmission of the preferred antenna node information to the terminal, the terminal may send the preferred antenna node information using a feedback channel.

However, if the proposed method is applied, since the BR or the SR is transmitted and, at this time, the preferred antenna node information is transmitted to the base station, the procedure can be remarkably simplified.

Hereinafter, a method of simultaneously transmitting a BR or an SR and preferred antenna node information to a base station will be described in greater detail.

First, the method of transmitting information about the SR and the preferred antenna information in 3GPP LTE will be described with reference to FIG. 8.

Figure 8:
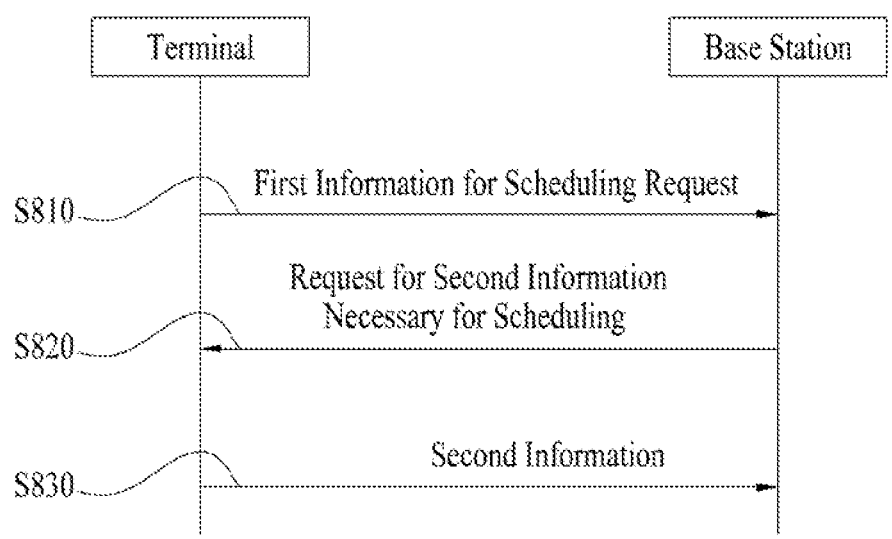
FIG. 8 is a diagram showing an example of transmitting information about a scheduling request at a terminal in 3GPP LTE.

FIG. 8 is a diagram showing an example of transmitting information about an SR at a terminal in 3GPP LTE.

First, a process of, at the terminal, transmitting the information about the SR such that resources are assigned will be described.

If the terminal has uplink information to be transmitted to the base station, the terminal first transmits, to the base station, the information about the SR for informing the base station that the uplink information is present (S810).

At this time, the information about the SR may be transmitted in the form of PUSCH format 1 and indicates only presence/absence of uplink information to be transmitted.

The base station receives the information about the SR and then transmits, to the terminal, information for requesting the terminal to transmit information (e.g., bandwidth information, etc.) necessary to assign resources (S820).

The terminal receives the request for information necessary to assign resources from the base station and then transmits the requested information to the base station via a PUSCH (S830).

The base station may assign resources to the terminal based on the received information and thus the terminal may transmit the uplink information to the base station.

At this time, if the terminal transmits the requested information to the base station (S830), preferred antenna node information may also be transmitted.

Further, in the current version of LTE-A, in order to reduce transmission processes of S810 to S830, a method of omitting steps S810 and S820 and transmitting the uplink information transmission request from the terminal to the base station via the PUSCH in step S830 is being discussed. Even in this case, the preferred antenna node information may be transmitted to the base station along with the uplink information transmission request.

In addition, by modifying PUCCH format 1 or using another format, the preferred antenna node information may be included and transmitted along with the information about the scheduling request.

That is, currently, PUCCH format 1 includes only presence/absence of information to be transmitted. However, other PUCCH formats may include a plurality of pieces of information. If the information about the SR may be transmitted via the other PUCCH formats, the preferred antenna node information may also be included and transmitted.

Next, a process of transmitting information about a BR from a terminal to a base station in IEEE 802.16m will be described with reference to FIGS. 9 and 10.

In IEEE 802.16m, the process of transmitting the information about the BR such that resources are assigned may be implemented by three steps or five steps.

First, a process of transmitting information about a BR in three steps will be described with reference to FIG. 9.

Figure 9:
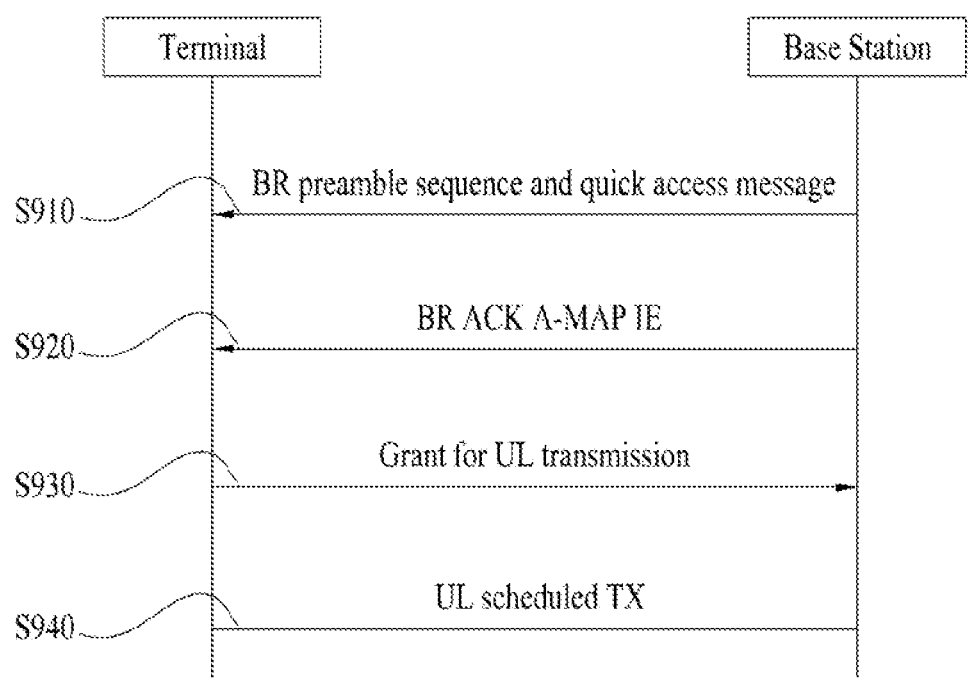
FIG. 9 is a diagram showing an example of transmitting information about a bandwidth request at a terminal in IEEE 802.16m.

FIG. 9 is a diagram showing an example of transmitting information about a BR at a terminal in IEEE 802.16m.

First, the terminal may transmit a quick access message including a BR preamble sequence for requesting bandwidth assignment and a terminal identifier to a base station, for resource assignment (S910).

The terminal identifier included in the quick access message may include a station ID (STID).

The base station transmits ACK for the received information to the terminal (S920) and transmits uplink grant for assigning resources for uplink transmission to the terminal (S930).

Thus, the terminal may transmit uplink information to the base station using the assigned resources (S940).

At this time, the terminal may include preferred antenna node information in the quick access message and transmit the quick access message to the base station. That is, the terminal may transmit the quick access message including the terminal ID and the preferred antenna node information to the base station.

Next, a process of simultaneously transmitting information about a BR and preferred antenna node information in five steps will be described.

Figure 10:
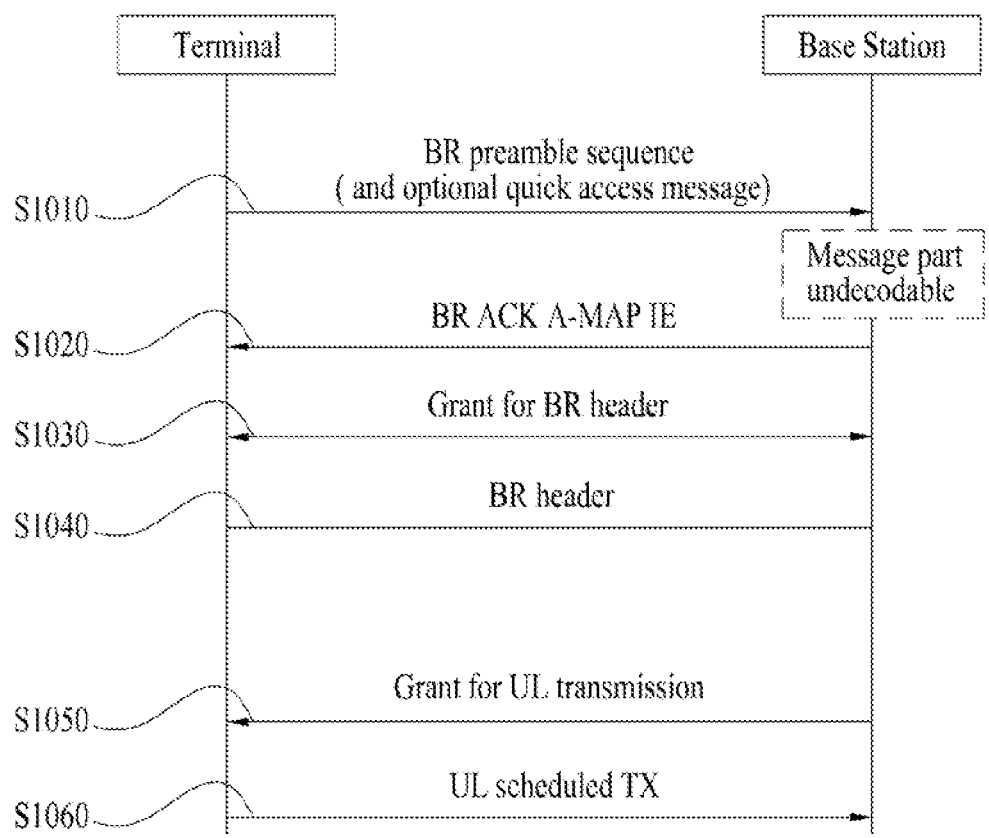
FIG. 10 is a diagram showing another example of transmitting information about a bandwidth request at a terminal in IEEE 802.16m.

FIG. 10 is a diagram showing another example of transmitting information about a bandwidth request at a terminal in IEEE 802.16m.

First, a terminal may transmit a BR preamble sequence for requesting bandwidth assignment to a base station, for resource assignment (S1010).

At this time, a quick access message may or may not be transmitted from the terminal to the base station.

Next, the base station transmits ACK for the received information to the terminal (S1020) and requests the terminal to transmit a BR header for resource assignment (S1030).

The terminal which has received the request for the BR header transmits the BR header to the base station (S1040). At this time, the BR header may include a terminal ID.

The terminal ID included in the BR header may include a station ID (STID).

The base station which has received the BR header transmits uplink grant for assigning resources for uplink transmission to the terminal (S1050).

Thus, the terminal may transmit uplink information to the base station using the assigned resources (S1060).

At this time, the terminal may include the preferred antenna node information in the BR header to transmit the preferred antenna node information to the base station.

FIG. 11 is a diagram showing an example of a format of a bandwidth request header in IEEE 802.16m.

As shown in FIG. 11, the format of the BR header includes a reserved 4-bit space and the preferred antenna node information may be included therein to be transmitted to the base station.

If the terminal transmits the quick access message to the base station in step S1010, the preferred antenna node information may be included in the quick access message to be transmitted to the base station.

If the preferred antenna node information is included in the quick access message, the quick access message is transmitted to the base station via the BR channel.

Accordingly, if the present invention is applied, unlike the conventional method of transmitting the preferred antenna node information from the terminal to the base station after the base station triggers transmission of the preferred antenna node information, since the preferred antenna node information may be transmitted to the base station using a simplified method, efficiency is increased.

Figure 12:
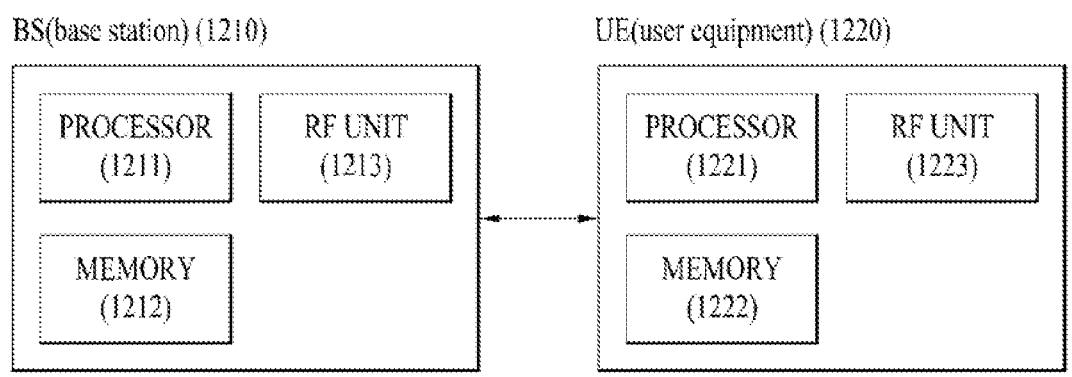
FIG. 12 is a block diagram showing the configuration of a communication device according to an embodiment of the present invention.

FIG. 12 is a block diagram showing the configuration of a base station and a terminal according to an embodiment of the present invention.

The base station 1210 includes a processor 1211, a memory 1212 and a radio frequency (RF) unit 1213. The RF unit 1213 may include a transmission module and a reception module. The processor 1211 performs the proposed function, process and/or method. The memory 1212 is connected to the processor 1211 to store a variety of information for driving the processor 1211. The RF unit 1213 is connected to the processor 1211 to transmit and/or receive a radio signal. The RF unit 1213 may include a plurality of nodes connected to the base station 1210 by wire.

The terminal (UE) 1220 includes a processor 1221, a memory 1222 and an RF unit 1223. The RF unit 1223 may include a transmission module and a reception module. For example, the processor 1211 transmits first information about a scheduling request (SR) to the base station through the transmission module in order to inform the base station of presence/absence of information to be transmitted to the base station, receives information for requesting transmission of second information necessary for scheduling from the base station through the reception module, controls transmission of the second information to the base station via the transmission module, and controls transmission of feedback information to the base station via the transmission module along with the first information or the second information. The memory 1222 is connected to the processor 1221 to store a variety of information for driving the processor 1221. The RF unit 1223 is connected to the processor 1221 to transmit and/or receive a radio signal.

The processor 1211 or 1221 may include an application specific integrated circuit (ASIC), another chipset, a logic circuit, a data processor and/or a converter for converting a baseband signal and a radio signal. The memory 1212 or 1222 may include a read only memory (ROM), a random access memory (RAM), a flash memory, a memory card, a storage medium and/or another storage device. The RF unit 1213 or 1223 may include at least one antenna which transmits and/or receives a radio signal. When the embodiment is implemented in software, the above-described method may be implemented by a module (process, function, etc.) for performing the above-described function. The module may be stored in the memory 1212 or 1222 and executed by the processor 1211 or 1221. The memory 1212 or 1222 may be provided inside or outside the processor and may be connected to the processor 1211 or 1221 using various well-known means.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), programmable logic devices (PLDs), field programmable gate arrays (FPGAs), a processor, a controller, a microcontroller, a microprocessor, another electronic unit or a combination thereof. In the case of implementing the present invention by software, the present invention can be implemented through a module for performing the above-described function. The software code may be stored in a memory unit so as to be driven by a processor. The memory unit or the processor may employ various well-known means.

It will be apparent to those skilled in the art that various modifications and variations can be made in the present invention without departing from the spirit or scope of the invention. Thus, it is intended that the present invention cover such modifications and variations provided they come within the scope of the appended claims and their equivalents.

INDUSTRIAL APPLICABILITY

The present invention is applicable to a multi-node system and a wireless communication system. More specifically, the present invention is applicable to a wireless mobile communication device for a cellular system.

The invention claimed is:

1. A method of transmitting feedback information at a terminal in a distributed antenna system including a plurality of antenna nodes in a same cell, the plurality of antenna nodes in the same cell being controlled by a base station, the method comprising:
    estimating, for each of the plurality of antenna nodes in the same cell, a reception signal level of a downlink signal;
    selecting a preferred antenna node among the plurality of antenna nodes in the same cell based on the reception signal level of the downlink signal;
    determining a random access (RA) preamble sequence from one of a plurality of preamble sequence sets,
    wherein each of the plurality of preamble sequence sets is linked to a respective one of the plurality of antenna nodes in the same cell; and
    transmitting the determined RA preamble sequence to the base station through a physical random access channel (RACH),
    wherein a number of the plurality of antenna nodes in the same cell is 8, and
    wherein a preamble set linked to a nth antenna node of the plurality of antenna nodes in the same cell is defined as preamble sequences having indexes $8n$ to $8n+7$.

2. The method according to claim 1, wherein the plurality of antenna nodes includes at least one of a macro base station, a picocell base station (PeNB), a home base station (HeNB), a remote radio head (RRH), a relay, an antenna or a distributed antenna group.

3. The method according to claim 1, further comprising:
    transmitting a reception signal level of the downlink signal of the preferred antenna node via the physical RACH, or
    transmitting the estimated reception signal level of the downlink signal via the physical RACH.

4. The method according to claim 1, wherein the preferred antenna node has a reception signal level equal or greater than a predetermined reception signal level.

5. A terminal for transmitting feedback information in a distributed antenna system including a plurality of antenna nodes in a same cell and a base station for controlling the plurality of antenna nodes in the same cell, the terminal comprising:
- a transmitter;
- a receiver; and
- a processor coupled to a memory and configured to:
    - estimate, for each of the plurality of antenna nodes in the same cell, a reception signal level of a downlink signal;
    - select a preferred antenna node among the plurality of antenna nodes in the same cell based on the reception signal level of the downlink signal;
    - determine a random access (RA) preamble sequence from one of a plurality of preamble sequence sets, wherein each of the plurality of preamble sequence sets is linked to a respective one of the plurality of antenna nodes in the same cell; and
    - transmit the determined RA preamble sequence to the base station through a physical random access channel (RACH),
    wherein a number of the plurality of antenna nodes in the same cell is 8, and
    wherein a preamble set linked to a nth antenna node of the plurality of antenna nodes in the same cell is defined as preamble sequences having indexes $8n$ to $8n+7$.

6. The terminal according to claim 5, wherein the plurality of antenna nodes includes at least one of a macro base station, a picocell base station (PeNB), a home base station (HeNB), a remote radio head (RRH), a relay, an antenna or a distributed antenna group.

7. The terminal according to claim 5, wherein the processor is configured to:
- transmit a reception signal level of the downlink signal of the preferred antenna node via the physical RACH, or
- transmit the estimated reception signal level of the downlink signal via the physical RACH.

8. The terminal according to claim 5, wherein the preferred antenna node has a reception signal level equal or greater than a predetermined reception signal level.

* * * * *